US012585597B2

(12) United States Patent
Zhang et al.

(10) Patent No.: US 12,585,597 B2
(45) Date of Patent: Mar. 24, 2026

(54) MEMORY WITH WRITE ADDRESS DELAY CIRCUIT

(71) Applicant: Sandisk Technologies, Inc., Milpitas, CA (US)

(72) Inventors: Lunkai Zhang, Portland, OR (US); Rasmus Madsen, Skovlunde (DK); Martin Lueker-Boden, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 112 days.

(21) Appl. No.: 18/747,497

(22) Filed: Jun. 19, 2024

(65) Prior Publication Data

US 2025/0390442 A1     Dec. 25, 2025

(51) Int. Cl.
  *G06F 12/14*       (2006.01)
  *G06F 13/16*       (2006.01)
(52) U.S. Cl.
  CPC ........ *G06F 12/1408* (2013.01); *G06F 12/145* (2013.01); *G06F 13/1689* (2013.01); *G06F 2212/402* (2013.01); *G06F 2212/7201* (2013.01)
(58) Field of Classification Search
  None
  See application file for complete search history.

(56) References Cited

U.S. PATENT DOCUMENTS

| | | | |
|---|---|---|---|
| 10,359,955 B2 | 7/2019 | Inbar et al. | |
| 11,301,369 B2 | 4/2022 | Gholamipour et al. | |
| 11,650,931 B2 | 5/2023 | Manganelli et al. | |
| 11,972,153 B1 | 4/2024 | Lercari et al. | |
| 2018/0059933 A1* | 3/2018 | Helmick | G06F 3/0683 |
| 2022/0171545 A1* | 6/2022 | Chritz | G11C 29/52 |

OTHER PUBLICATIONS

JEDEC, "NAND Flash Interface Interoperability," JEDEC Standard, JESD230D, Jun. 2019, 78 pages.

* cited by examiner

*Primary Examiner* — Nathan Sadler
(74) *Attorney, Agent, or Firm* — Pearl Cohen Zedek Latzer Baratz LLP

(57)          ABSTRACT

An apparatus includes control circuits configured to connect to a memory structure. The control circuits are configured to receive a write request that includes a logical address with write data corresponding to the logical address, encrypt the write data to obtain encrypted write data and map the logical address to a physical address in the memory structure. The control circuits are further configured to delay output of the physical address by a delay period to align output of the physical address and the encrypted write data.

20 Claims, 14 Drawing Sheets

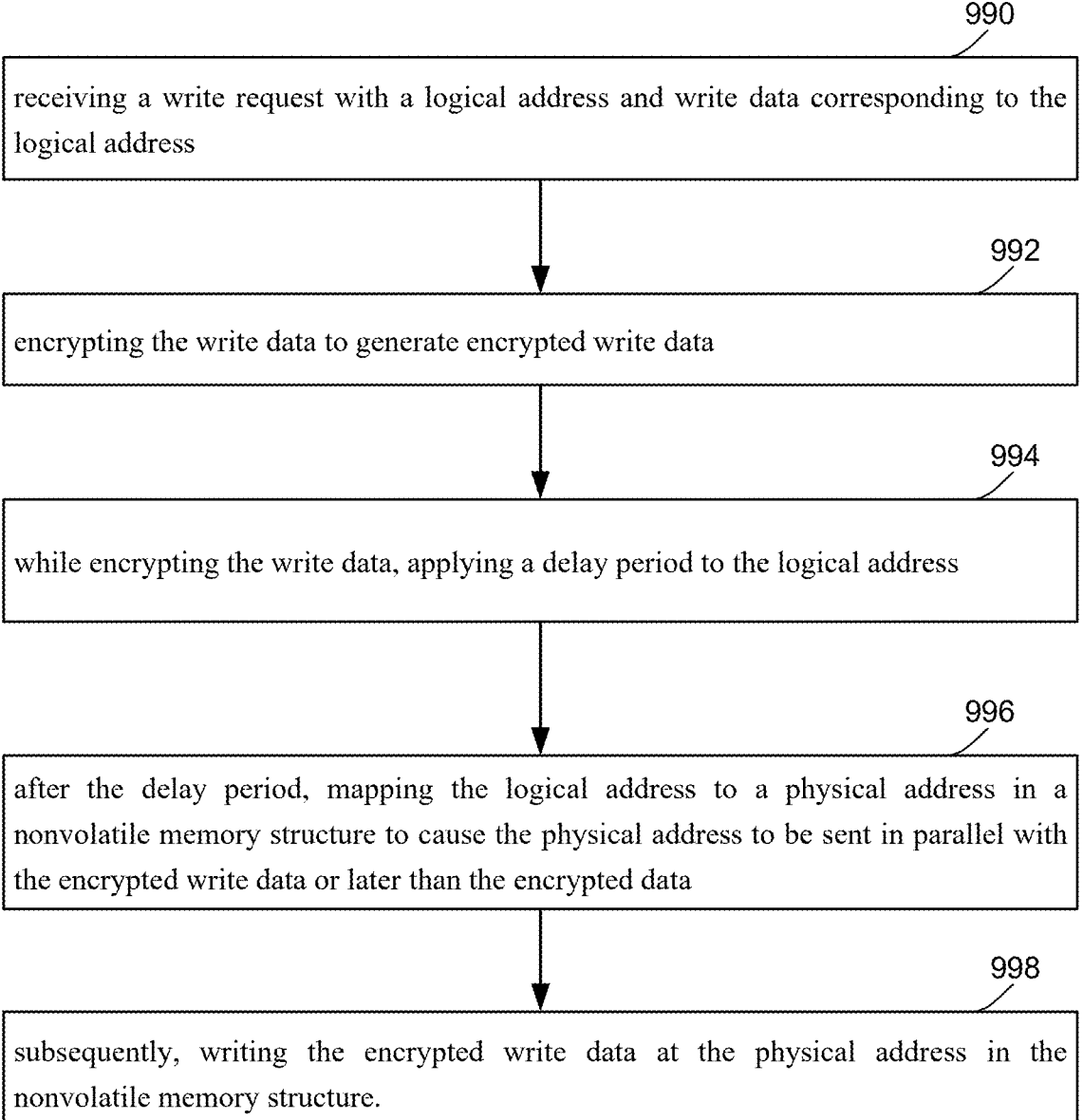

990 receiving a write request with a logical address and write data corresponding to the logical address

992 encrypting the write data to generate encrypted write data

994 while encrypting the write data, applying a delay period to the logical address

996 after the delay period, mapping the logical address to a physical address in a nonvolatile memory structure to cause the physical address to be sent in parallel with the encrypted write data or later than the encrypted data

998 subsequently, writing the encrypted write data at the physical address in the nonvolatile memory structure.

Figure 9B

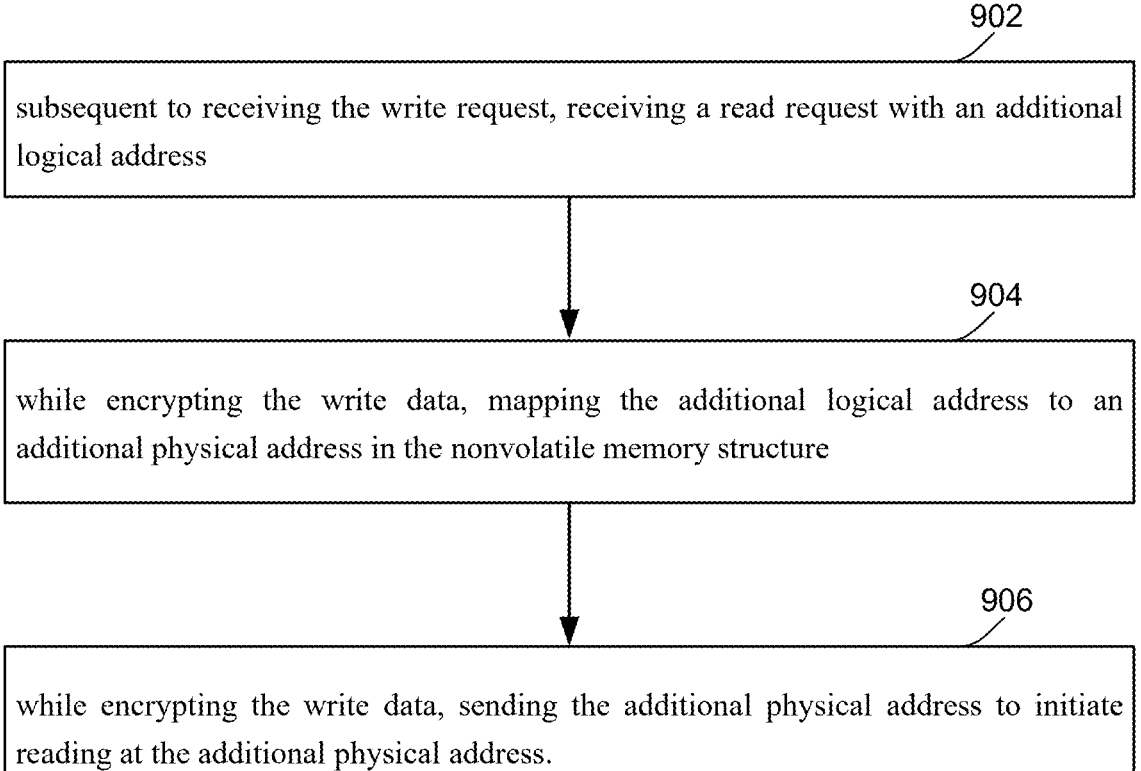

902 subsequent to receiving the write request, receiving a read request with an additional logical address

904 while encrypting the write data, mapping the additional logical address to an additional physical address in the nonvolatile memory structure

906 while encrypting the write data, sending the additional physical address to initiate reading at the additional physical address.

MEMORY WITH WRITE ADDRESS DELAY CIRCUIT

BACKGROUND

The present technology relates to data storage systems that include memories including nonvolatile memories.

Memory is widely used in various electronic devices such as cellular telephones, digital cameras, personal digital assistants, medical electronics, mobile computing devices, non-mobile computing devices, and data servers. Memory may comprise nonvolatile memory or volatile memory. A non-volatile memory allows information to be stored and retained even when the nonvolatile memory is not connected to a source of power (e.g., a battery).

Examples of nonvolatile memory include flash memory including NAND flash memory, ReRAM memories (resistive random access memories), magnetoresistive memory (e.g., MRAM, Spin Transfer Torque MRAM, Spin Orbit Torque MRAM), FeRAM (Ferroelectric random access memory), phase change memory (e.g., PCM), Selector-Only Memory (SOM), and the like.

In a data storage system, control circuits may be connected to NAND, ReRAM, MRAM, FeRAM, PCM, SOM or other memory to facilitate memory access (e.g., to facilitate read and write operations in response to read and write requests from a host). Control circuits may be located on the same die as the memory and/or on a separate die or dies. Control circuits may include circuits to map an address sent by a host (logical address) to a corresponding location in memory (physical address). Control circuits may include encryption circuits to encrypt data prior to storage. In a system that includes control circuits and a memory structure, the configuration of the control circuits may affect system performance including read and write performance.

BRIEF DESCRIPTION OF THE DRAWINGS

Like-numbered elements refer to common components in the different Figures (FIGS.).

FIG. 5 shows an example of operation of the data storage system of FIG. 4.

FIGS. 9A-B show examples of methods of operating a data storage system that include applying a delay period.

DETAILED DESCRIPTION

The technology described herein includes a data storage system with control circuits that are configured to receive a write request or command (e.g., from a host) that includes a logical address and write data and to delay output of a physical address corresponding to the logical address by a delay period (e.g., using a delay circuit that is configured to delay input of the logical address to a logical-to-physical (L-to-P) mapping circuit). Write data is encrypted prior to storage in a memory structure and output of the physical address may be delayed to ensure that the physical address is available (e.g., available to media control circuits connected to the memory structure) at the same time, or later than the encrypted write data.

Aligning sending of the physical address of a write request and the corresponding encrypted write data may avoid blocking other requests that may be received while encryption of write data is ongoing. For example, delaying sending the physical address may enable media control circuits to accept another request (e.g., read request) that is received while encryption is in progress (e.g., a read request that is received during the delay period may be send to media control circuits before the delayed physical address of the write request so that reading may be initiated prior to writing. In this way, read latency may be reduced.

Aspects of the present technology provide technical solutions to technical problems associated with achieving low read latency, for example, in data storage systems in which write data is encrypted prior to storage, write addresses are subject to L-to-P mapping and encryption takes more time than L-to-P mapping. Technical solutions include applying a delay to align physical addresses generated by L-to-P mapping with encrypted write data (e.g., physical address arrives at media control circuits at the same time or later than the corresponding encrypted write data), which may avoid a write request unnecessarily blocking a subsequent read request (e.g., by maintaining availability of media control circuits until completion of write data encryption).

Figure 1A:
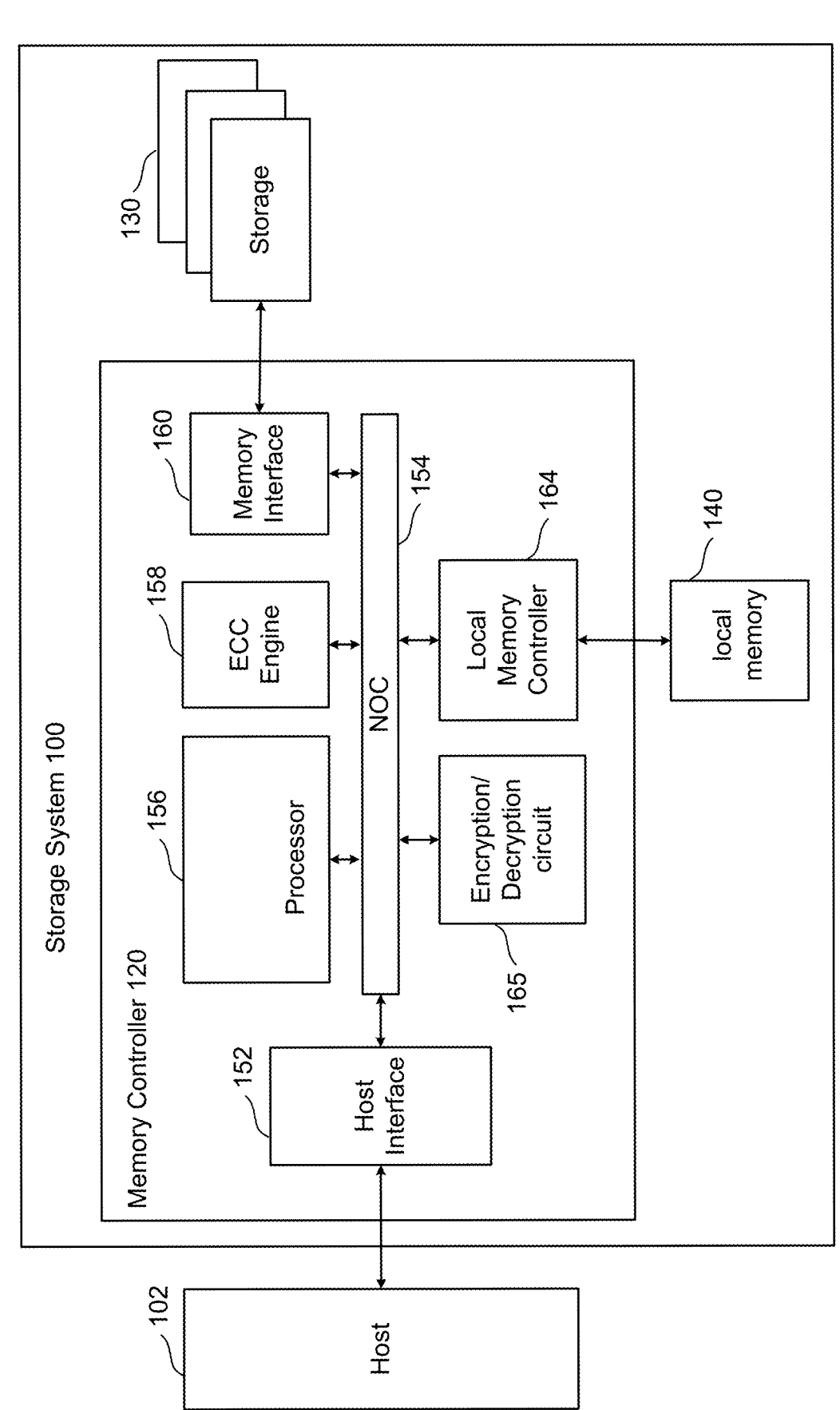
FIG. 1A is a block diagram of one embodiment of a storage system connected to a host.

FIG. 1A is a block diagram of one embodiment of a data storage system 100 (storage system) that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1A are electrical circuits. Storage system 100 includes a memory controller 120 (or storage controller) connected to memory package 130 and local high speed memory 140 (e.g., DRAM, SRAM, MRAM).

Local memory 140 is non-transitory memory, which may include volatile memory or non-volatile memory. Local high speed memory 140 is used by memory controller 120 to perform certain operations. For example, local high speed memory 140 may store logical to physical address mapping tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus.

Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 may also implement a mapping or translation circuit, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as appropriate among the locations of the one or more memory die. For example, a wear leveling scheme may be implemented so that frequently accessed data (hot data that is frequently written or read) is moved to avoid excessive wear at any physical location. To implement this system, memory controller 120 (e.g., the mapping circuit) performs address mapping between the logical addresses used by the host and the physical addresses used by the memory die. One example implementation is to maintain tables (i.e. the L2P tables mentioned above) that identify the current mapping between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure.

Memory interface 160 communicates with memory packages 130. In one embodiment, memory interface provides a Toggle Mode interface. Other interfaces can also be used. In some example implementations, memory interface 160 (or another portion of memory controller 120) implements a scheduler and buffer for transmitting data to and receiving data from one or more memory die.

Encryption/decryption circuit 165 performs encryption of write data (e.g., data received from host 102 with a write request) prior to writing the data in a memory package 130. For example, unencrypted write data may be received from host 102 by host interface 152, which may send the unencrypted write data to encryption/decryption circuit 165. Encryption/decryption circuit 165 then applies an encryption algorithm to generate encrypted write data, which is sent to memory interface 160 for storage in a memory package 130. Subsequently, when the data is read (e.g., in response to a read command from host 102), the encrypted read data is sent from memory interface 160 to encryption/decryption circuit 165, which generates decrypted read data (e.g., original unencrypted data) and sends the decrypted read data to host interface 152, which sends it to host 102.

Figure 1B:
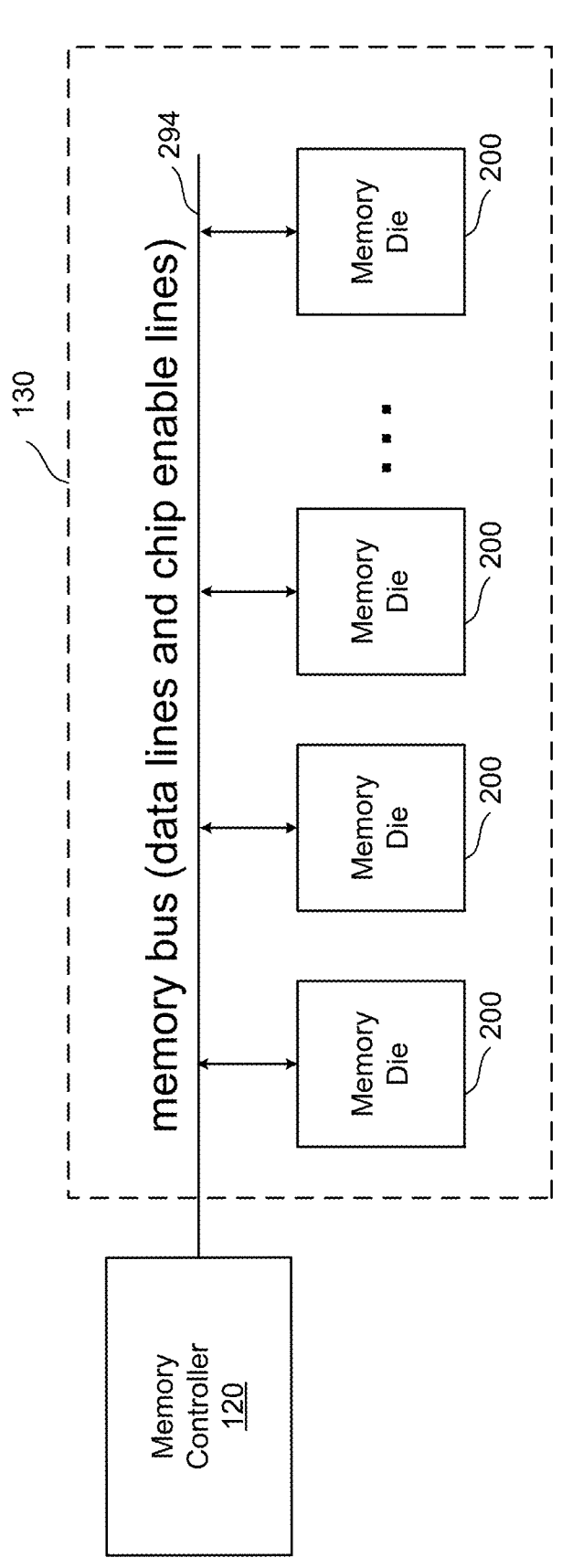
FIG. 1B is a block diagram of one embodiment of a memory package.

FIG. 1B is a block diagram of one embodiment of a memory package 130 that includes a plurality of memory die 200 connected to a memory bus 294 (data lines and chip enable lines). The memory bus 294 connects to the memory interface of a memory controller 120 (e.g., memory interface 160). In some embodiments, the memory package can include a small controller connected to the memory bus. The memory package can have one or more memory die. In one embodiment, each memory package includes eight or 16 memory die; however, other numbers of memory die can also be implemented. The technology described herein is not limited to any particular number of memory die. In some cases, a TM interface may be implemented in a memory die (e.g., one or more of memory dies 200). In some cases, a TM interface may be implemented in a control die that is coupled to (e.g., directly bonded to) a memory die. The present technology is not limited to any particular type of interface (TM or other such interface) or to any location (e.g., memory die, controller die, or other location).

Figure 2A:
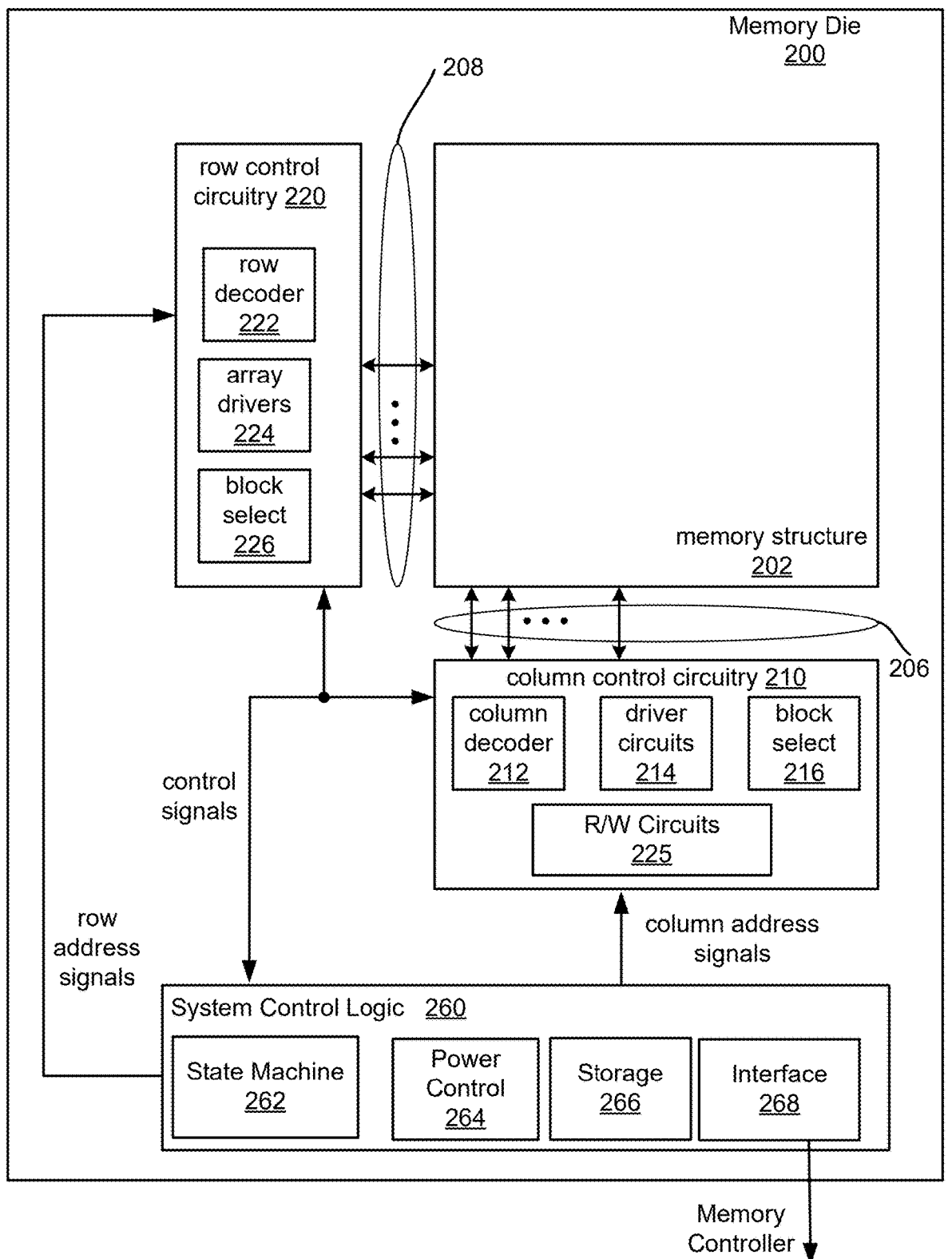
FIG. 2A is a functional block diagram of an embodiment of a memory die.

In one embodiment, a memory package 130 comprises one or more memory dies. FIG. 2A is a functional block diagram of one embodiment of a memory die 200 that comprises non-volatile storage. Each of the one or more memory dies of memory package 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic 260, and typically may include such circuits as row decoders 222, array drivers 224, and block select circuit 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for memory structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuit 216, as well as read/write circuitry, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands (requests) and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used. While NAND flash memory is widely used, a range of alternative data storage technologies (sometimes referred to as "emerging memory technologies") are currently proposed and/or in use as alternatives to more established technologies such as NAND flash.

The exact type of memory array architecture or memory cell included in memory structure 202 is not limited to any particular technology. Many different types of memory array architectures or memory technologies can be used to form memory structure 202. No particular non-volatile memory technology is required for purposes of the new claimed embodiments proposed herein. Examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like. While aspects of the present technology may be applied to emerging nonvolatile memories, some or all aspects may be applicable to established nonvolatile memories and/or volatile memories.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 3) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 2B:
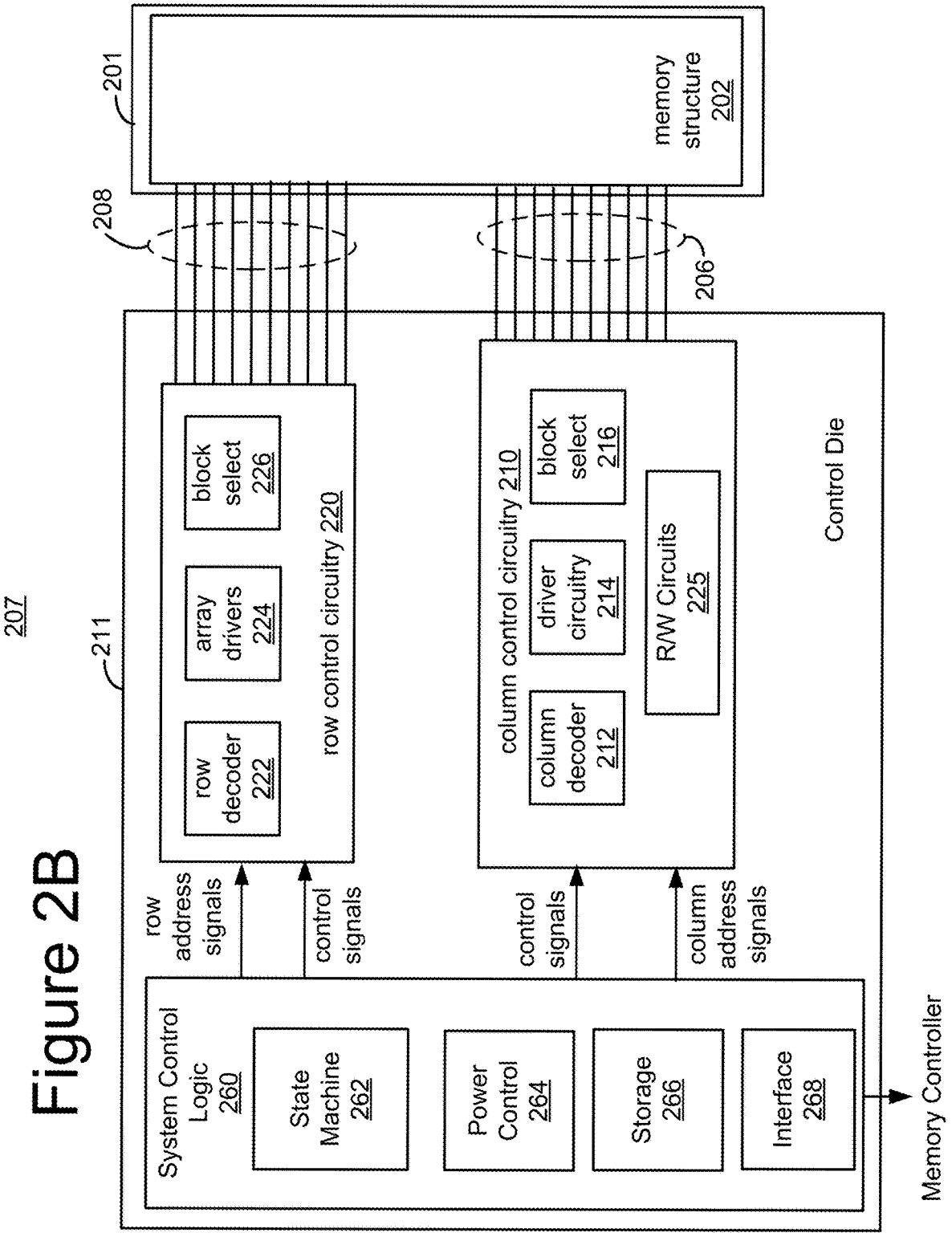
FIG. 2B is a functional block diagram of an embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement memory package 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate memory controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuits 214, and block select circuit 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select circuit 226 are coupled to memory structure 202 through electrical paths 208. Each of electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, state machine 262, power control module 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, memory package 130, memory die 200, integrated memory assembly 207, and/or control die 211.

Figure 3A:
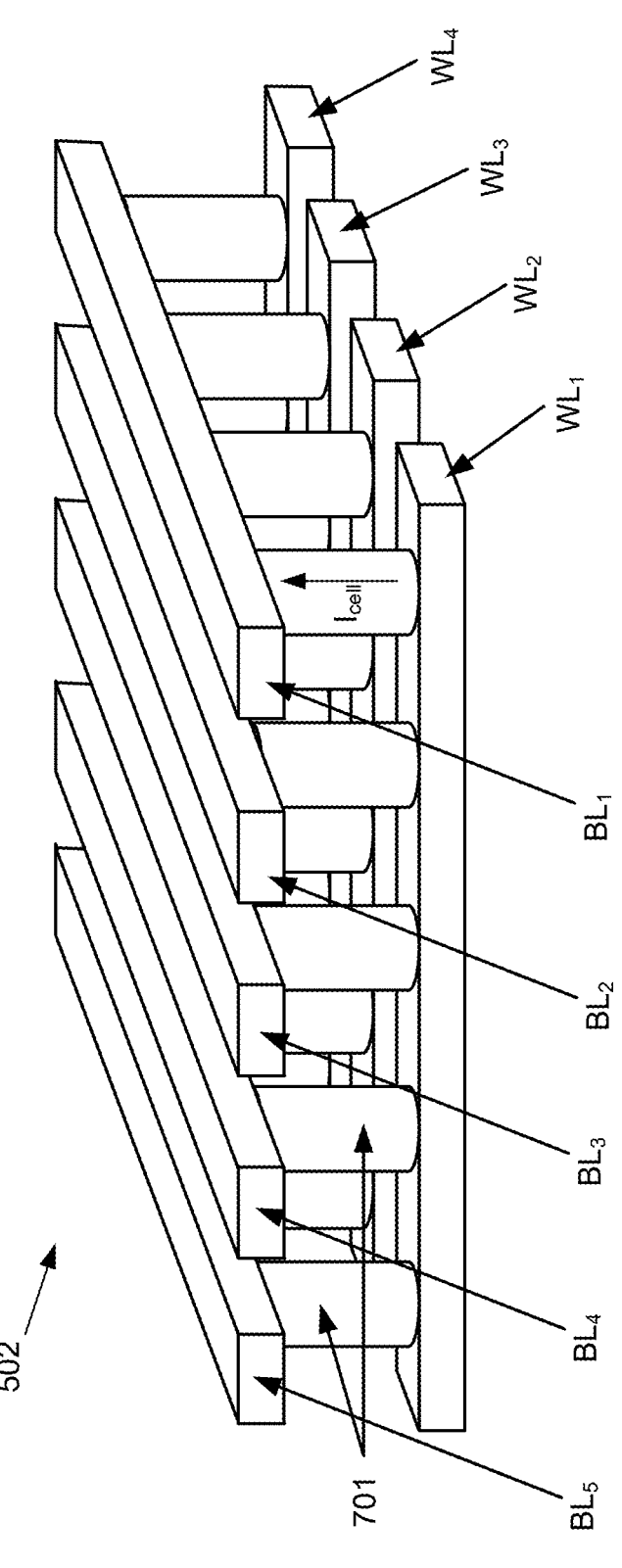
FIGS. 3A-D show an example of a three dimensional (3D) memory structure.

FIG. 3A depicts one embodiment of a portion of a memory array that forms a cross-point architecture in an oblique view. Memory array 502 of FIG. 3A is one example of an implementation of memory structure 202. The bit lines BL1-BL5 are arranged in a first direction (e.g., "bit line direction" represented as running into the page) relative to an underlying substrate (not shown) of the die and the word lines WL1-WL5 are arranged in a second direction (e.g., "word line direction") perpendicular to the first direction (across the page). FIG. 3A is an example of a horizontal cross-point memory cell structure in which word lines WL1-WL5 and BL1-BL5 both run in a horizontal direction relative to the substrate, while the memory cells, two of which are indicated at 701, are oriented so that the current through a memory cell (such as shown at Icell) runs in the vertical direction. In a memory array with additional layers of memory cells, such as discussed below with respect to FIG. 3D, there would be corresponding additional layers of bit lines and word lines.

As depicted in FIG. 3A, memory array 502 includes a plurality of memory cells 701. The memory cells 701 may include re-writeable memory cells, such as can be implemented using ReRAM, MRAM, PCM, FeRAM, SOM, or other material with a programmable resistance. The current in the memory cells of the first memory level is shown as flowing upward as indicated by arrow Icell, but current can flow in either direction.

Figure 3B:
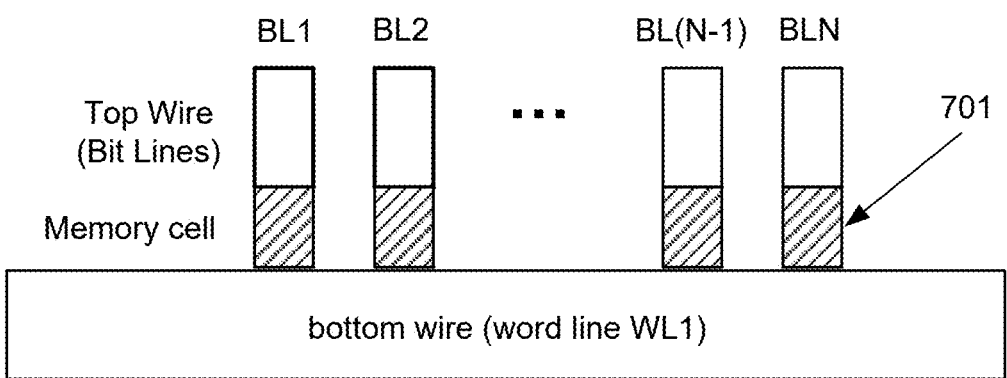
Figure 3C:
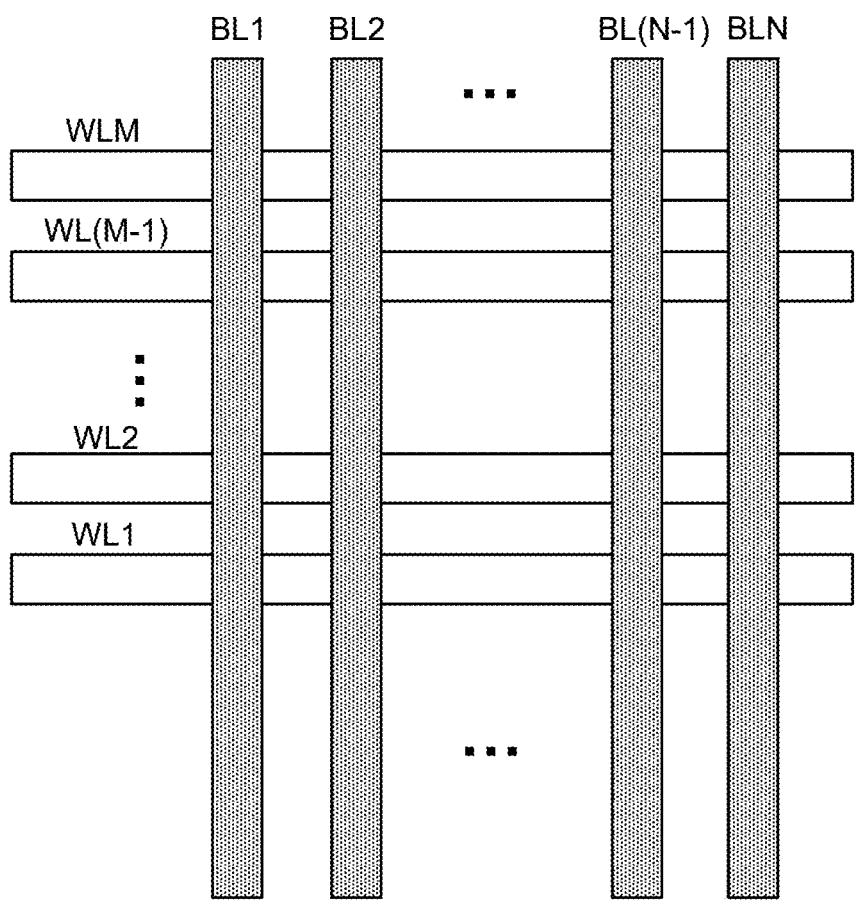

FIGS. 3B and 3C respectively present side and top views of the cross-point structure in FIG. 3A. The sideview of FIG. 3B shows one bottom wire, or word line, WL1 and the top wires, or bit lines, BL1-BLn. At the cross-point between each top wire and bottom wire is a memory cell, (e.g., ReRAM, PCM, FeRAM, MRAM, SOM or other memory). FIG. 3C is a top view illustrating the cross-point memory cell structure for M bottom wires WL1-WLM and N top wires BL1-BLN. In a binary embodiment, the memory cell at each cross-point can be programmed into one of two resistance states: high and low.

The cross-point array of FIG. 3A illustrates an embodiment with one layer of word lines and bits lines, with the memory cells sited at the intersection of the two sets of conducting lines. To increase the storage density of a memory die, two or more levels or layers of such memory cells and conducting lines can be formed. A 2-layer example is illustrated in FIG. 3D.

Figure 3D:
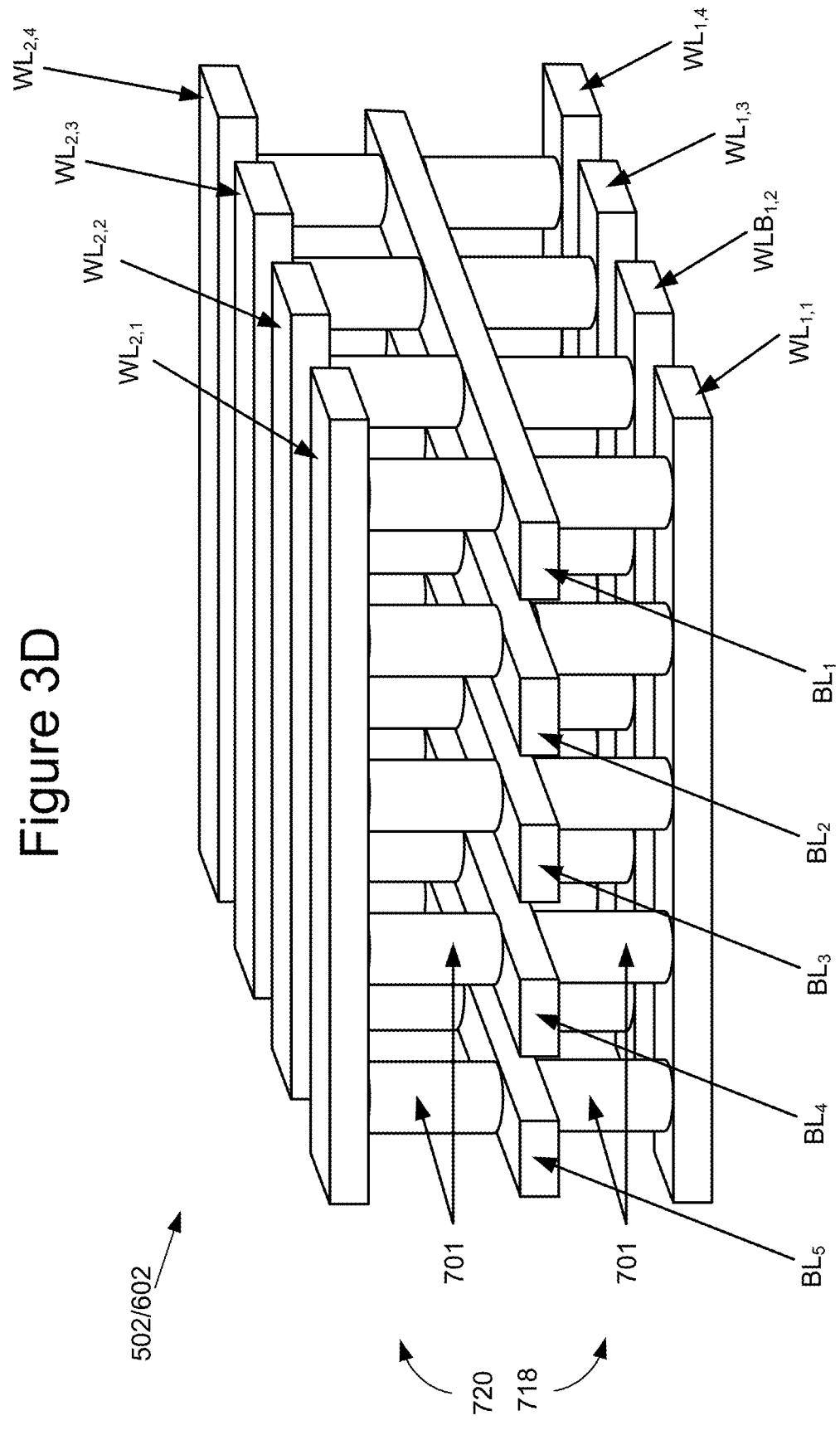

FIG. 3D depicts an embodiment of a portion of a two level memory array that forms a cross-point architecture in an oblique view. As in FIG. 3A, FIG. 3D shows a first layer 718 of memory cells 701 of a memory array 502 connected at the cross-points of the first layer of word lines WL1,1-WL1,4 and bit lines BL1-BL5. A second layer of memory cells 720 is formed above the bit lines BL1-BL5 and between these bit lines and a second set of word lines WL2,1-WL2,4. Although FIG. 3D shows two layers, 718 and 720, of memory cells, the structure can be extended upward through additional alternating layers of word lines and bit lines. Depending on the embodiment, the word lines and bit lines of the array of FIG. 3D can be biased for read or program operations such that current in each layer flows from the word line layer to the bit line layer or the other way around. The two layers can be structured to have current flow in the same direction in each layer for a given operation, e.g. from bit line to word line for read, or to have current flow in the opposite directions, e.g. from word line to bit line for layer 1 read and from bit line to word line for layer 2 read.

In some examples, a threshold switching selector device is connected in series with the programmable resistive element. A threshold switching selector has a high resistance (in an off or non-conductive state) when it is biased to a voltage lower than its threshold voltage, and a low resistance (in an on or conductive state) when it is biased to a voltage higher than its threshold voltage. The threshold switching selector remains on until its current is lowered below a holding current, or the voltage is lowered below a holding voltage. When this occurs, the threshold switching selector returns to the off state. Accordingly, to program a memory cell at a cross-point, a voltage or current may be applied which is sufficient to turn on the associated threshold switching selector and set or reset the memory cell; and to read a memory cell, the threshold switching selector similarly must be activated by being turned on before the resistance state of the memory cell can be determined. One set of examples for a threshold switching selector is an ovonic threshold switching material of an Ovonic Threshold Switch (OTS). Aspects of the present technology may be applied to memory structures that include a selector for each memory cell and those that do not include such selectors.

Figure 4:
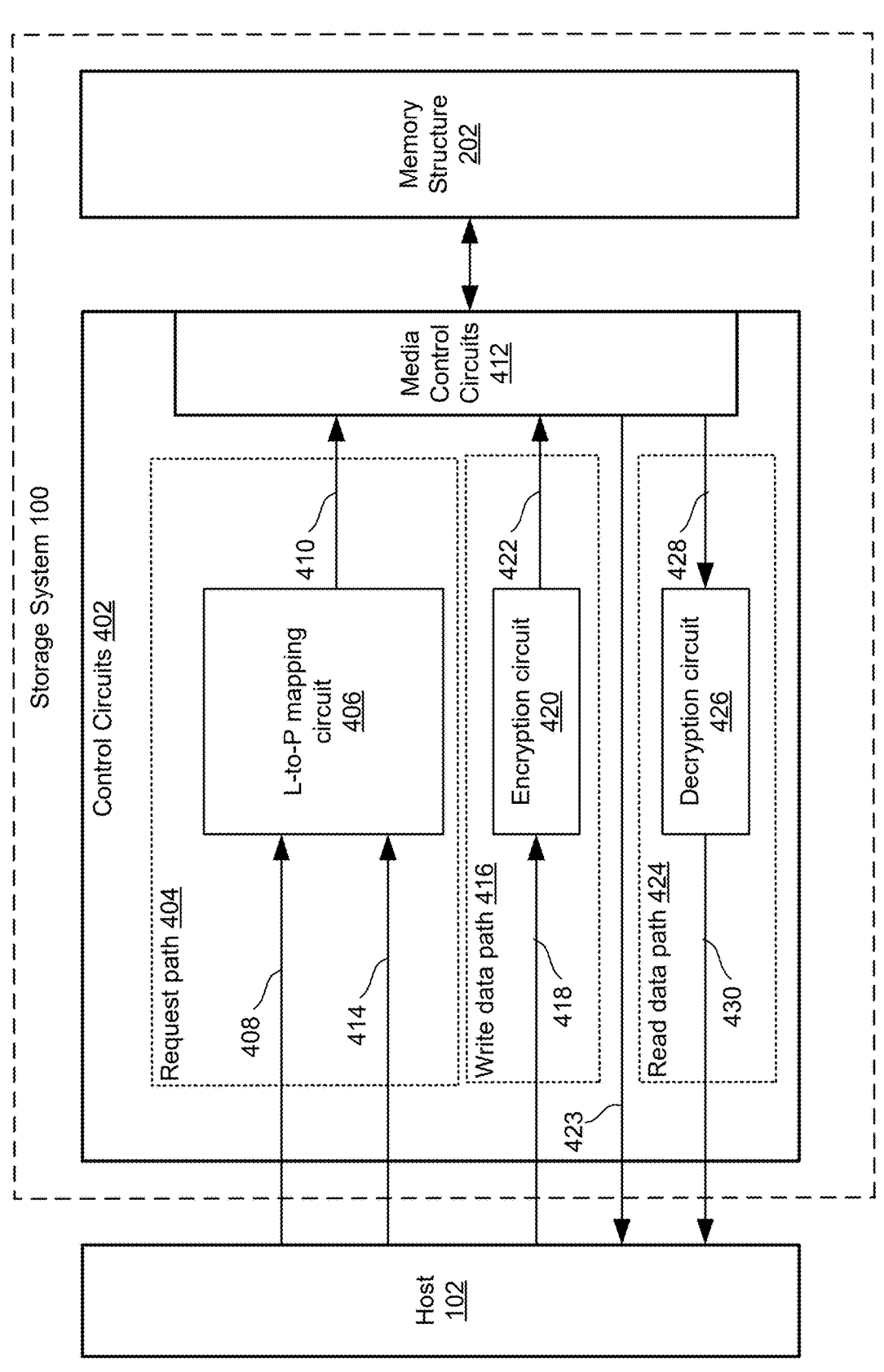
FIG. 4 shows an example of a data storage system that includes control circuits connected to a memory structure.

FIG. 4 shows an example of storage system 100 connected to host 102 (e.g., as previously shown in FIG. 1A) including control circuits 402, which may include circuits of a memory controller (e.g., memory controller 120) and/or on-chip control circuits (e.g., row control, column control and/or system control logic circuits as illustrated in FIG. 2A) and/or circuits of a control die (e.g., control die 211 of FIG. 2B). Control circuits 402 are connected to memory structure 202, which may be an emerging memory structure such as Resistive Random Access Memory (ReRAM), Magnetoresistive Random Access Memory (MRAM), Ferroelectric Random Access Memory (FeRAM) or Phase Change Memory (PCM).

FIG. 4 illustrates how read and write requests (commands) from host 102 that are directed to memory structure 202 may be handled by control circuits 402. Read and write requests from host 102 are sent via request path 404, which includes Logical-to-Physical (L-to-P) mapping circuit 406, which maps (e.g., translates or converts) logical addresses received in host requests to corresponding physical addresses that correspond to locations in memory structure 202 at which the corresponding data is located or to be located. For example, L-to-P mapping circuit 406 may implement a wear-leveling scheme to ensure that different physical locations in memory structure 202 are accessed at similar rates and memory access is not concentrated excessively in any particular location, which could cause premature failure. While processor 156 was previously described as an example of a circuit to perform L-to-P mapping, any suitable circuit in a memory controller or elsewhere may perform L-to-P mapping and the present technology is not limited to a memory controller.

In the example of FIG. 4, request path 404 includes separate paths for read and write requests (e.g., host 102 and/or L-to-P mapping circuit 406 may include separate ports for read and write requests and host 102 may output read and write requests separately via distinct paths). For example, read requests with logical addresses of data to be read (read data) are sent from host 102 via path 408 to L-to-P mapping circuit 406, which outputs read requests with corresponding physical addresses on path 410 to media control circuits 412, which causes reading of the read data at corresponding physical locations in memory structure 202 (e.g., by causing appropriate voltages to be applied to selected components of memory structure 202 to read memory cells at the physical location indicated). Media control circuits 412 may include row control circuits, column control circuits and/or logic circuits (e.g., system control logic 260 and/or memory interface 160).

Write requests with logical addresses of data to be written (write data) are sent from host 102 via path 414 to L-to-P mapping circuit 406, which outputs write requests with corresponding physical addresses on path 410 (e.g., L-to-P mapping circuit 406 may have separate ports for logical addresses of read and write requests and may have a single output for sending corresponding physical addresses to media control circuits 412 via common path 410).

FIG. 4 also shows write data path 416 for data to be written with a write request. Write requests may be sent with corresponding data to be written (write data), which is sent from host 102, via path 418 to encryption circuit 420 (e.g., implemented by encryption/decryption circuit 165 of memory controller 120), which performs encryption of the write data and outputs encrypted write data on path 422. When media control circuits 412 receive a write request with a corresponding physical address via path 410 and receive corresponding encrypted write data via path 422, media control circuits 412 may cause writing (programming) of the encrypted write data at the physical address indicated. Media control circuits may also cause a write acknowledgement indicator to be sent via path 423 to host 102 to indicate that the write data is written.

Because data in memory structure 202 is encrypted, decryption of read data that is read from memory structure 202 is performed prior to sending the data to host 102. For example, read data path 424 includes decryption circuit 426 (e.g., implemented by encryption/decryption circuit 165 of memory controller 120) to decrypt raw read data from memory structure 202 (e.g., to reverse encryption performed by encryption circuit 420 in order to return original unencrypted data). Media control circuits 412 send encrypted read data that is read from memory structure 202 (raw data) via path 428 to decryption circuit 426, which decrypts the encrypted read data and outputs decrypted read data to host 102 via path 430 (e.g., returns original, unencrypted data). FIG. 4 is a simplified illustration and control circuits may include additional circuits that are omitted from FIG. 4 for simplicity (e.g., ECC encoder/decoder circuits and/or other control circuits shown in FIGS. 1A-2B).

Figure 5:
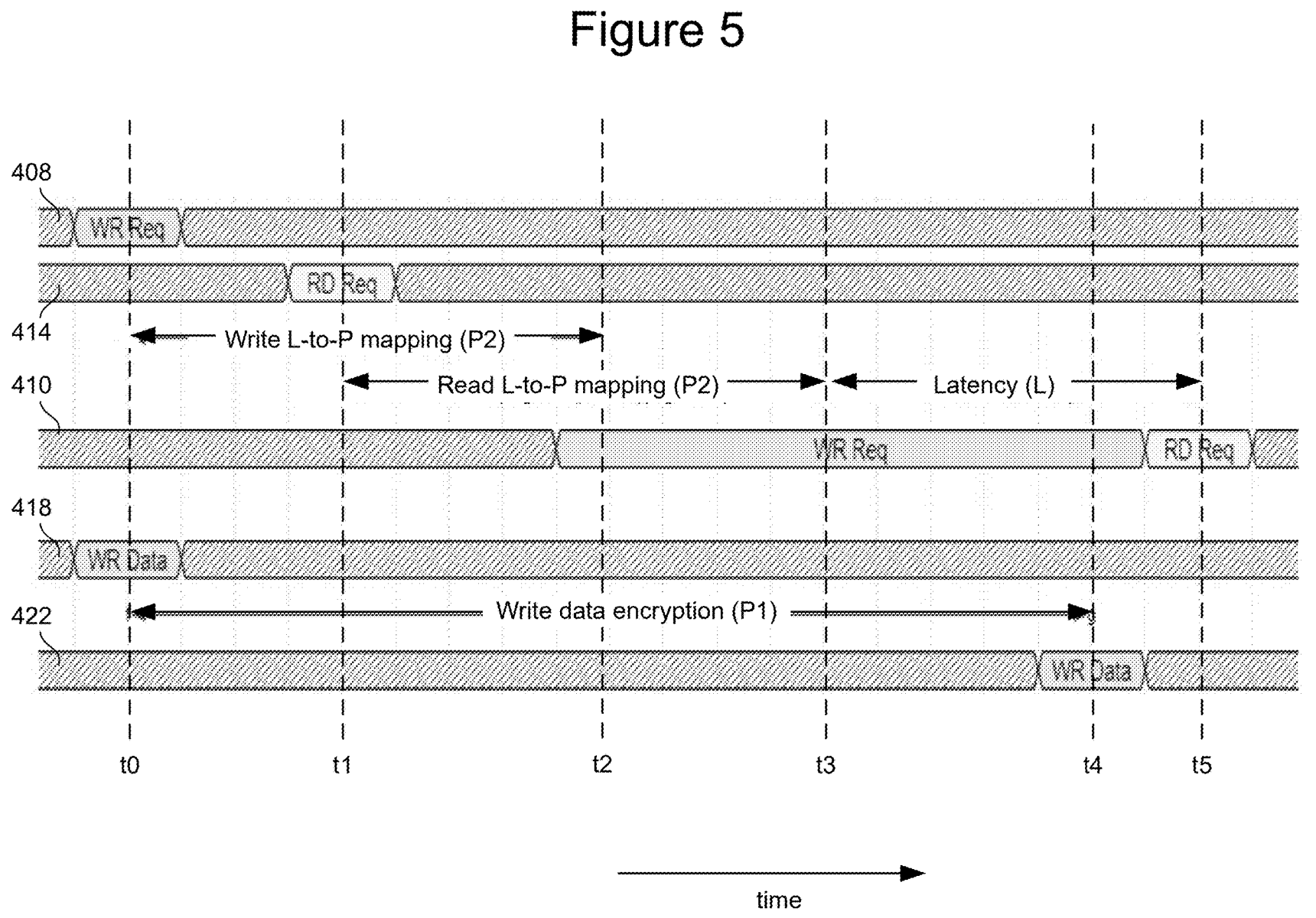

FIG. 5 shows a timing diagram that illustrates an example of operation of control circuits 402 when a write request ("WR Req") is received followed by a read request ("RD Req"). Write request, WR Req, is received at time to via path 408 while corresponding write data ("WR Data") is received at time to via path 418. Write data encryption by Encryption circuit 420 begins at time t0 and continues for a first period, P1, until time t4. In parallel, L-to-P mapping of a corresponding logical address or address range (e.g., logical address received in write request WR Req) by L-to-P mapping circuit 406 begins at time t0 and continues for a second period, P2, until time t2. Because data encryption takes longer than L-to-P mapping (e.g., P1>P2) a physical address at which to write the encrypted data may be available before the corresponding encrypted data is available and is sent to media control circuits 412 when it is available (e.g., at time t2).

FIG. 5 shows receipt of a read request ("RD Req") via path 414 at time t1, while write L-to-P mapping is ongoing (e.g., during period P2). Read L-to-P mapping by L-to-P mapping circuit 406 begins at t1 and continues for second period P2 until t3 (e.g., time period for L-to-P mapping, P2, is the same for read and write addresses in this example). While L-to-P mapping is complete at time t3 so that a physical address is available to initiate a read operation, a read operation does not begin at t3. Write request WR Req is ahead of read request, RD Req, and may delay sending RD Req to media control circuits 412. For example, media control circuits 412 may not act on write request, WR Req, until Encryption circuit 420 completes encryption and sends encrypted write data to media control circuits 412 at time t4 (at the end of first period, P1). From sending the write logical address to media control circuits 412 at time t2 until media control circuits 412 receive encrypted write data at time t4, media control circuits may not be available to accept any other request. For example, subsequent requests (e.g., RD Req) may be blocked by write request, WR Req, until encrypted data is sent and media control circuits 412 can initiate writing.

After media control circuits 412 have accepted write request, WR Req, with associated logical address and encrypted write data WR Data (e.g., initiating a write operation to write the encrypted write data at the physical address or addresses obtained in memory structure 202), read request RD Req is accepted by media control circuits 412 at time t5. The result of read request, RD Req, being blocked by write request, WR Req, is a period of latency (L) from time t3 to time t5 (e.g., L-to-P mapping finishes and a physical address to read is available at time t3 but media control circuits 412 cannot initiate reading until t5, which delays reading).

In some cases, read latency may be an important parameter so that latency period (L) may be undesirable. Aspects of the present technology provide circuits and methods that may reduce read latency and avoid request bandwidth penalties. For example, a delay circuit may be provided to delay output of a physical address (e.g., by delaying input of corresponding logical address) by a delay period to align output of the physical address for a write operation with the corresponding encrypted write data. This may avoid blocking the read request by encryption of write data. For example, when a read request is received during the delay period, while write encryption is ongoing, L-to-P mapping of a read address may be performed and the read request with the corresponding physical address sent to media control circuits before the delayed physical address for the write request is sent so that the read request may be executed first, which reduces read latency.

Figure 6:
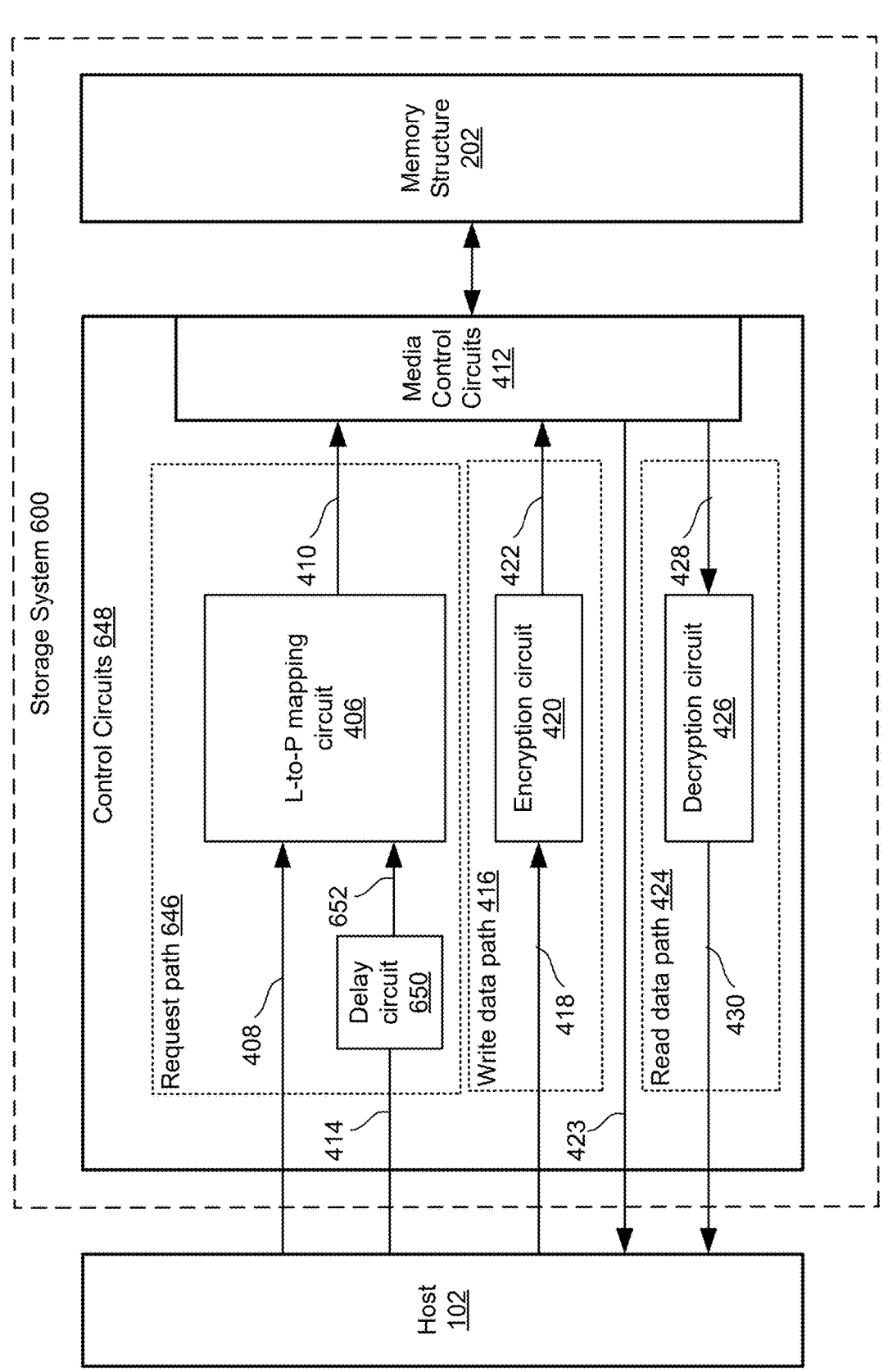
FIG. 6 shows an example of a data storage system that includes a delay circuit.

FIG. 6 shows an example storage system 600 that includes a delay circuit 650 in request path 646 of control circuits 648. Certain components of storage system 600 are similar to components of storage system 400, may operate in a similar manner and are similarly numbered. Delay circuit 650 receives logical addresses associated with write requests via path 414 and sends the logical addresses to L-to-P mapping circuit 406, via path 652, after a delay period. In this way, initiation of L-to-P mapping of addresses associated with write requests is delayed by the delay period and output of corresponding physical addresses is delayed by the delay period. For example, the delay period may be configured to align output of the physical addresses associated with write requests with output of corresponding encrypted write data (physical address output at the same time or later than the corresponding encrypted write data).

Logical addresses associated with read requests are sent via path 408, which does not include a delay circuit (e.g., path 408 bypasses delay circuit 650) such that L-to-P mapping circuit 406 receives logical addresses associated with read requests and outputs corresponding physical addresses without an added delay period. Because output of physical addresses associated with write requests is delayed until encryption of corresponding write data is complete, media control circuits 412 may be available to accept a read request that is received during the delay period. For example, while FIG. 5 shows read request, RD Req, being blocked by write request, WR Req, adding a delay may avoid such blocking and enable a read request to be acted on sooner (e.g., without latency (L)).

Figure 7:
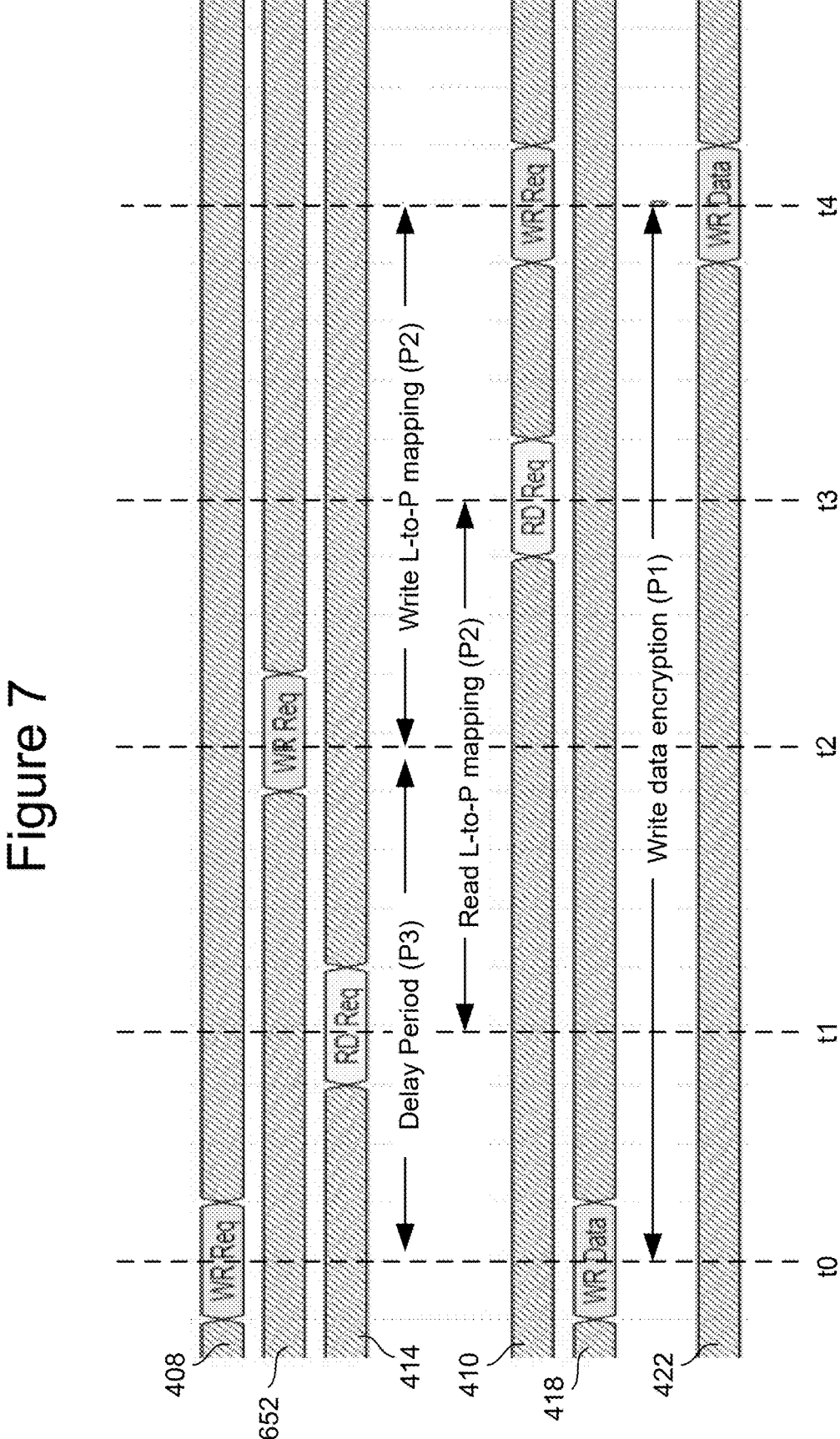
FIG. 7 shows an example of operation of the data storage system of FIG. 6.

FIG. 7 shows a timing diagram to illustrate operation of control circuits 648. FIG. 7 provides an example of alignment of output of the physical address of WR Req from L-to-P mapping circuit 406 via path 410 and output of the encrypted write data of WR Data from encryption circuit 420 via path 422. In the example shown, the physical address and encrypted data are output at the same time, t4 (e.g., same clock cycle) while in other examples, the physical address may be output at some time after the encrypted data (e.g., after t4). The combination of delay circuit 650, L-to-P mapping circuit 406 and encryption circuit 420, (or control circuits 648, which include these circuits) may be considered an example of means for receiving a write request with a logical address and write data corresponding to the logical address, encrypting the write data to generate encrypted write data, mapping the logical address to a physical address in the nonvolatile memory structure while encrypting the write data and applying a delay period to cause the physical address to be sent in parallel with the encrypted write data or later than the encrypted write data.

FIG. 7 shows a scenario similar to that illustrated in FIG. 5, with write request, WR Req, and corresponding write data, WR Data, received at time t0, and read request, RD Req, received subsequently at time t1. As in FIG. 5, write data is received via path 418 and encryption by Encryption circuit 420 begins at time to. In contrast with FIG. 5, a delay period (third period, P3) is applied to a logical address received via path 414 (e.g., delay circuit 650 receives a logical address and then sends the logical address to L-to-P mapping circuit 406, via path 652, at time t2, after a time period P3). L-to-P mapping circuit 406 begins write L-to-P mapping at time t2 and continues until time t4 (a period P2) so that output of the physical address and corresponding encrypted write data are aligned. When read request, RD Req, is received via path 414 at time t1, read L-to-P mapping is initiated and continues until t3, for second period P2, after which RD Req, with the physical address to read, is sent to media control circuits via path 410. It can be seen that physical addresses of read requests are output a shorter time after receipt than physical addresses of write requests (e.g., after P2 compared with P2+P3).

At time t3, write L-to-P mapping is still ongoing and a corresponding write physical address has not yet been sent to media control circuits 412. Media control circuits 412 accept read request, RD Req, at time t3 and may initiate reading of read data at the physical location indicated. In contrast to FIG. 5, path 410 is not blocked by WR Req at time t3 so that RD Req can be accepted by media control circuits 412 and executed without delay. Subsequently, when write data encryption ends and write L-to-P mapping is complete (e.g., write physical address output by L-to-P mapping circuit 406) at time t4, media control circuits 412 accept the write physical address via path 410 and corresponding encrypted data via path 422 and initiate a write operation to write the encrypted data at the physical address indicated.

In the example of FIG. 7, delay period P3 is configured to ensure that write L-to-P mapping ends at the same time (e.g., same clock cycle) as write data encryption. For example, delay (third) period P3 is the difference between write data encryption period P1 and write L-to-P mapping period P2 (e.g., P3=P1-P2). In other examples, delay period P3 may be sufficient so that L-to-P mapping ends after write data encryption (e.g., P3>P1-P2).

In some cases, L-to-P mapping may not take a constant time (e.g., second period P2 may not be constant). Second period P2 may be a variable period with a range (e.g., P2min to P2max) and the delay period P3 may be equal to or greater than the difference between the first period, P1, and a smallest value of the second period in the range (e.g., P2min) such that the physical address is sent in parallel with the encrypted write data or later than the encrypted data for all values of the second period within the range (e.g., P3≥P1-P2min).

Delay circuit 650 is shown located at an input to L-to-P mapping circuit 406 to delay inputting a logical address to L-to-P mapping circuit 406 and thereby delay L-to-P mapping of write addresses. Alternatively, delay circuit 650 may be located at an output of L-to-P mapping circuit to delay sending a physical address to media control circuits 412. In another example, a first delay circuit may be provided at the input side (e.g., delay circuit 650) and another delay circuit may be provided at the output side of L-to-P mapping circuit 406 to implement an appropriate combined delay.

Figure 8:
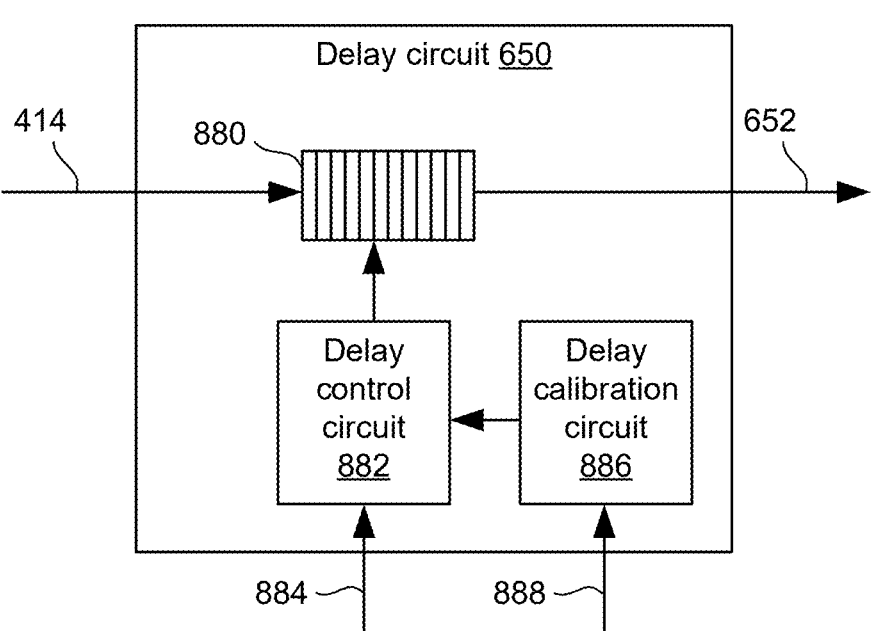
FIG. 8 shows an example of a delay circuit.

Delay circuit 650 may be implemented by any suitable circuit. FIG. 8 shows an example implementation of delay circuit 650 that includes a First-In First-out (FIFO) buffer (or "FIFO") 880, which is used to generate an output on path 652 that is identical to an input received on path 414, after some delay period (e.g., P3). In the example of FIG. 8, delay circuit 650 includes a delay control circuit 882, which is configured to control a delay applied by FIFO 880 (e.g., to cause a delay of a number of clock cycles, n, where n may be fixed or variable). Input 884 allows delay period P3 (e.g., value of n) to be set to specified value (e.g., set in firmware and/or based on testing). Input 884 may allow the value of n to be set to zero to disable delay circuit 650.

Delay calibration circuit 886 may specify delay period P3 based on input 888. For example, delay calibration circuit 886 may monitor one or more operation and calculate a delay period accordingly. In an example, input 888 may include information relating to at least one of first period P1 (period for write data encryption) and second period P2 (period for L-to-P mapping), which may not be constant. For example, write data encryption period P1 may depend on the encryption scheme used and/or the type of data to be encrypted. L-to-P mapping period P2 may depend on the wear leveling scheme used and/or the number of entries in a L-to-P address mapping table (e.g., searching a table may take more time as the number of entries increases). Delay calibration circuit 886 may calibrate delay period P3 according to P1 and P2 (e.g., to ensure that P3≥P1-P2 as values of P1 and P2 change). Calibration may be performed during initialization or at any subsequent time (e.g., recalibration in response to a triggering event such as increase in read latency or other parameter).

FIG. 9A shows an example of a method that may be implemented in a storage system such as storage system 600. The method includes receiving a write request with a logical address and write data corresponding to the logical address 990 (e.g., WR Req and WR Data), encrypting the write data to generate encrypted write data 992 (e.g., write data encryption over period P1), while encrypting the write data, applying a delay period to the logical address 994. The method further includes, after the delay period, mapping the logical address to a physical address in a nonvolatile memory structure (e.g., write L-to-P mapping over period P2) to cause the physical address to be sent in parallel with the encrypted write data or later than the encrypted data 996 (e.g., at or later than t4) and subsequently, writing the encrypted write data at the physical address in the nonvolatile memory structure 998 (e.g., media control circuits 412 cause encrypted write data to be written at specified physical location in memory structure 202).

FIG. 9B shows an example of a method that illustrates how the method of FIG. 9A may provide low read latency when a read request is received. The method includes subsequent to receiving the write request (e.g., write request of step 990), receiving a read request with an additional logical address 902 (e.g., receiving RD Req at time t1), while encrypting the write data, mapping the additional logical address to an additional physical address in the nonvolatile memory structure 904 (e.g., read L-to-P mapping (P2)) and while encrypting the write data, sending the additional physical address to initiate reading at the additional physical address 906 (e.g., while write data encryption is ongoing during P1, sending RD Req at time t3).

According to a first set of aspects, an apparatus includes one or more control circuits configured to connect to a memory structure. The one or more control circuits are configured to receive a write request that includes a logical address with write data corresponding to the logical address, encrypt the write data to obtain encrypted write data and map the logical address to a physical address in the memory structure. The control circuits are configured to delay output of the physical address by a delay period to align output of the physical address and the encrypted write data.

In one or more example of the above apparatus, the control circuits are configured to encrypt the write data in a first period and send the encrypted write data to the memory structure after the first period, map the logical address to the physical address in a second period that is less than the first period and the delay period is equal to or greater than the difference between the first period and the second period.

In one or more example of the above apparatus, the one or more control circuits include a logical-to-physical mapping circuit connected in series with a delay circuit.

In one or more example of the above apparatus, the one or more control circuits include an encryption circuit connected in parallel with the logical-to-physical mapping circuit and the delay circuit.

In one or more example of the above apparatus, the delay circuit includes a First-In First-Out (FIFO) buffer in series with the logical-to-physical mapping circuit to delay output of physical addresses from the logical-to-physical mapping circuit for all logical addresses received in write requests.

In one or more example of the above apparatus, the one or more control circuits include a path for logical addresses of read requests, the path bypasses the FIFO buffer such that the logical-to-physical mapping circuit outputs physical addresses for all read requests without the delay period.

In one or more example of the above apparatus, the memory structure is one of: Resistive Random Access Memory (ReRAM), Magnetoresistive Random Access Memory (MRAM), Ferroelectric Random Access Memory (FeRAM) or Phase Change Memory (PCM).

In one or more example of the above apparatus, the one or more control circuits are located on a control die that is configured to connect to a memory die that includes the memory structure to form an integrated memory assembly.

According to another set of aspects, a method includes receiving a write request with a logical address and write data corresponding to the logical address; encrypting the write data to generate encrypted write data; while encrypting the write data, mapping the logical address to a physical address in a nonvolatile memory structure; applying a delay period to cause the physical address to be sent in parallel with the encrypted write data or later than the encrypted write data; and subsequently, writing the encrypted write data at the physical address in the nonvolatile memory structure.

In one or more example of the above method, subsequent to receiving the write request, receiving a read request with an additional logical address; while encrypting the write data, mapping the additional logical address to an additional physical address in the nonvolatile memory structure; and while encrypting the write data, sending the additional physical address to initiate reading at the additional physical address.

In one or more example of the above method, the method further includes reading read data from the additional physical address; decrypting the read data to generate decrypted read data; and sending the decrypted read data in response to the read request.

In one or more example of the above method, reading the read data from the additional physical address is performed prior to writing the encrypted write data at the physical address.

In one or more example of the above method, applying the delay period includes delaying the logical address at an input to a logical-to-physical mapping circuit to delay initiation of mapping the logical address to the physical address.

In one or more example of the above method, receiving the read request occurs during the delay period such that mapping the additional logical address occurs earlier than mapping the logical address.

In one or more example of the above method, encrypting the write data extends over a first period, mapping the logical address to the physical address extends over a second period that is shorter than the first period and the delay period is equal to or greater than the difference between the first period and the second period.

In one or more example of the above method, the second period is a variable period with a range and the delay period is equal to or greater than the difference between the first period and a smallest value of the second period in the range such that the physical address is sent in parallel with the encrypted write data or later than the encrypted write data for all values of the second period within the range.

In one or more example, the method further includes applying the delay period to cause physical addresses of all write requests to be delayed; and applying no delay to physical addresses of read requests such that physical addresses of read requests are output a shorter time after receipt than physical addresses of write requests.

In another set of aspects, a system includes a nonvolatile memory structure; and means for receiving a write request with a logical address and write data corresponding to the logical address, encrypting the write data to generate encrypted write data, mapping the logical address to a physical address in the nonvolatile memory structure while encrypting the write data and applying a delay period to cause the physical address to be sent in parallel with the encrypted write data or later than the encrypted write data.

In one or more example of the above system, the non-volatile memory structure is one of: Resistive Random Access Memory (ReRAM), Magnetoresistive Random Access Memory (MRAM), Ferroelectric Random Access Memory (FeRAM) or Phase Change Memory (PCM).

In one or more example of the above system, the non-volatile memory structure is located on a memory die and the means for receiving, encrypting, mapping and applying a delay period are located on a control die that is bonded to the memory die to form an integrated memory assembly.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. An apparatus, comprising:
one or more control circuits configured to connect to a memory structure, the one or more control circuits configured to:
receive a write request that includes a logical address with write data corresponding to the logical address, encrypt the write data to obtain encrypted write data and map the logical address to a physical address in the memory structure, delay output of the physical address by a delay period to align output of the physical address and the encrypted write data.

2. The apparatus of claim 1, wherein the control circuits are configured to encrypt the write data in a first period and send the encrypted write data to the memory structure after the first period, map the logical address to the physical address in a second period that is less than the first period and the delay period is equal to or greater than the difference between the first period and the second period.

3. The apparatus of claim 1, wherein the one or more control circuits include a logical-to-physical mapping circuit connected in series with a delay circuit.

4. The apparatus of claim 3, wherein the one or more control circuits include an encryption circuit connected in parallel with the logical-to-physical mapping circuit and the delay circuit.

5. The apparatus of claim 3, wherein the delay circuit includes a First-In First-Out (FIFO) buffer in series with the logical-to-physical mapping circuit to delay output of physical addresses from the logical-to-physical mapping circuit for all logical addresses received in write requests.

6. The apparatus of claim 5, wherein the one or more control circuits include a path for logical addresses of read requests, the path bypasses the FIFO buffer such that the logical-to-physical mapping circuit outputs physical addresses for all read requests without the delay period.

7. The apparatus of claim 1, wherein the memory structure is one of: Resistive Random Access Memory (ReRAM), Magnetoresistive Random Access Memory (MRAM), Ferroelectric Random Access Memory (FeRAM) or Phase Change Memory (PCM).

8. The apparatus of claim 7, wherein the one or more control circuits are located on a control die that is configured to connect to a memory die that includes the memory structure to form an integrated memory assembly.

9. A method comprising:
receiving a write request with a logical address and write data corresponding to the logical address;
encrypting the write data to generate encrypted write data;
while encrypting the write data, mapping the logical address to a physical address in a nonvolatile memory structure;
applying a delay period to cause the physical address to be sent in parallel with the encrypted write data or later than the encrypted write data; and
subsequently, writing the encrypted write data at the physical address in the nonvolatile memory structure.

10. The method of claim 9, further comprising:
subsequent to receiving the write request, receiving a read request with an additional logical address;
while encrypting the write data, mapping the additional logical address to an additional physical address in the nonvolatile memory structure; and
while encrypting the write data, sending the additional physical address to initiate reading at the additional physical address.

11. The method of claim 10, further comprising:
reading read data from the additional physical address;
decrypting the read data to generate decrypted read data; and
sending the decrypted read data in response to the read request.

12. The method of claim 11, wherein reading the read data from the additional physical address is performed prior to writing the encrypted write data at the physical address.

13. The method of claim 10, wherein applying the delay period includes delaying the logical address at an input to a logical-to-physical mapping circuit to delay initiation of mapping the logical address to the physical address.

14. The method of claim 13, wherein receiving the read request occurs during the delay period such that mapping the additional logical address occurs earlier than mapping the logical address.

15. The method of claim 9, wherein encrypting the write data extends over a first period, mapping the logical address to the physical address extends over a second period that is shorter than the first period and the delay period is equal to or greater than the difference between the first period and the second period.

16. The method of claim 15, wherein the second period is a variable period with a range and the delay period is equal to or greater than the difference between the first period and a smallest value of the second period in the range such that the physical address is sent in parallel with the encrypted write data or later than the encrypted write data for all values of the second period within the range.

17. The method of claim 9, further comprising:
applying the delay period to cause physical addresses of all write requests to be delayed; and
applying no delay to physical addresses of read requests such that physical addresses of read requests are output a shorter time after receipt than physical addresses of write requests.

18. A system comprising:
a nonvolatile memory structure; and
means for receiving a write request with a logical address and write data corresponding to the logical address, encrypting the write data to generate encrypted write data, mapping the logical address to a physical address in the nonvolatile memory structure while encrypting the write data and applying a delay period to cause the physical address to be sent in parallel with the encrypted write data or later than the encrypted write data.

19. The system of claim 18, wherein the nonvolatile memory structure is one of: Resistive Random Access Memory (ReRAM), Magnetoresistive Random Access Memory (MRAM), Ferroelectric Random Access Memory (FeRAM) or Phase Change Memory (PCM).

20. The system of claim 18, wherein the nonvolatile memory structure is located on a memory die and the means for receiving, encrypting, mapping and applying a delay period are located on a control die that is bonded to the memory die to form an integrated memory assembly.

* * * * *